United States Patent [19]
Kaufmann

[11] Patent Number: 5,483,539
[45] Date of Patent: Jan. 9, 1996

[54] PROGRAMMABLE PCM/TDM DEMULTIPLEXER

[75] Inventor: John Kaufmann, Palo Alto, Calif.

[73] Assignee: Loral Aerospace Corp., New York, N.Y.

[21] Appl. No.: 179,757

[22] Filed: Jan. 7, 1994

Related U.S. Application Data

[63] Continuation-in-part of Ser. No. 955,493, Oct. 2, 1992, abandoned, which is a continuation of Ser. No. 612,285, Nov. 7, 1990, abandoned.

[51] Int. Cl.$^6$ ................................................ H04J 3/07
[52] U.S. Cl. .................... 370/112; 370/102; 370/105.1; 370/105.4; 375/368
[58] Field of Search ................ 370/46, 77, 58.1, 370/102, 105.1, 105.4, 112; 328/105, 106, 107; 307/244, 243; 375/116, 368

[56] References Cited

U.S. PATENT DOCUMENTS

| | | | |
|---|---|---|---|
| 3,909,541 | 9/1975 | Bobilin | 370/112 |
| 4,377,861 | 5/1983 | Huffman | 370/112 |
| 4,409,683 | 10/1983 | Woodward | 370/112 |
| 4,430,734 | 2/1984 | Hubbard | 370/112 |
| 4,542,500 | 9/1985 | Jean-Claude | 370/102 |
| 4,649,536 | 3/1987 | Krinock | 370/102 |
| 4,674,088 | 6/1987 | Grover | 370/102 |
| 4,768,192 | 8/1988 | Pattavina et al. | 370/105.1 |
| 4,788,681 | 11/1988 | Thomas et al. | 370/105.1 |
| 4,977,558 | 12/1990 | Iguchi et al. | 370/112 |
| 4,984,238 | 1/1991 | Watanabe et al. | 370/105.1 |
| 5,014,272 | 5/1991 | Yoshida | 370/105.1 |

*Primary Examiner*—Hassan Kizou
*Attorney, Agent, or Firm*—Kenneth W. Float; Anthony W. Karambelas

[57] ABSTRACT

A programmable PCM/TDM demultiplexer including an FA function unit including Frame Alignment Logic (FAL) hardware controlled by a Programmable Frame Alignment Controller (PFAC), and accompanied by a DECommutation and dejustification (DEC) function unit including Output Logic Hardware (OLH) controlled by a Programmable Decommutator Sequencer (PDS) controlled in turn by a Programmable Decommutator Sequencer Controller (PDSC).

11 Claims, 8 Drawing Sheets

Fig. 1

(PRIOR ART)

PROGRAMMABLE PCM/TDM DEMULTIPLEXER

This application is a continuation-in-part application of patent application Ser. No. 07/955,493, filed Oct. 2, 1992, now abandoned, which is a continuation of patent application Ser. No. 07/612,285, filed Nov. 7, 1990, now abandoned.

BACKGROUND OF THE INVENTION

1. Technical Field

The present invention relates generally to Pulse Code Modulated/Time Division Multiplexed data communications apparatus and more particularly to an improved means for accomplishing high frequency demultiplexing.

2. Discussion of the Prior Art

Figure 1:
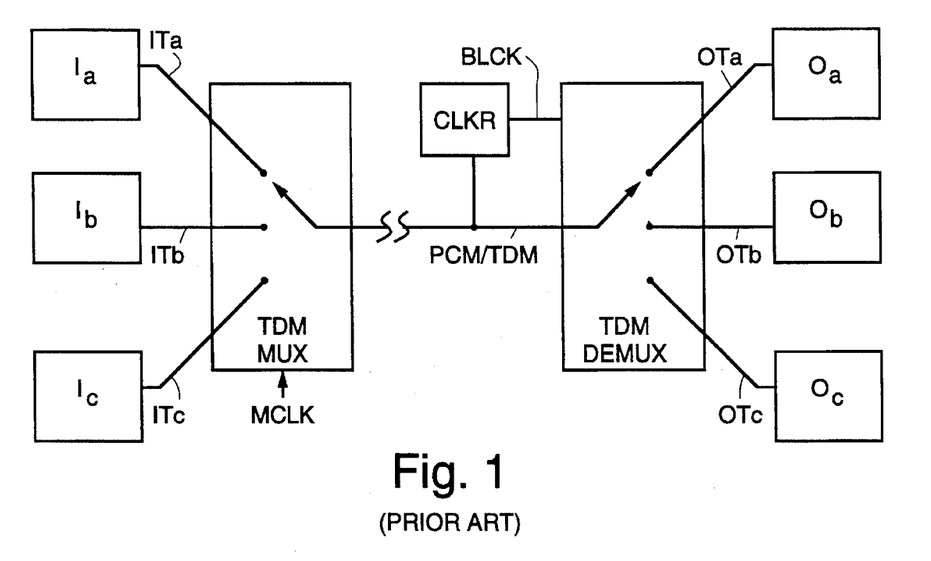
FIG. 1 represents a simplified PCM/TDM communications link.

FIG. 1 represents individual electronic data sources Ia, Ib, Ic, . . . timed by local oscillators (CLKa), (CLKb), (CLKc) and transmitting Pulse Code Modulated (PCM) data signals at input rates RATEa, RATEb, RATEc, via Input Tributaries (ITa, ITb, ITc) to inputs of a conventional Time Division Multiplexer (TDM MUX). TDM MUX, driven by its transmitter-oscillator Master CloCK (MCLK), samples the tributaries in some selected order at a rate faster than the total allowed input rate and, as higher frequency-translated data bit signals, multiplexes then into time-slots of a PCM/TDM signal stream. This stream is then received and de-multiplexed by PCM/TDM demultiplexer TDM DEMUX, which produces individual output data streams on output tributaries OTa, OTb, and OTc, to output devices Oa, Ob, and Oc. Clock recovery unit CLKR derives the Bit CLocK signal (BCLK) from the PCM/TDM signal stream for use by the TDM DEMUX. After clock recovery has been performed, the demultiplexing process involves the additional steps of frame alignment, dejustification, and decommutation.

Frame Alignment

Figure 2:
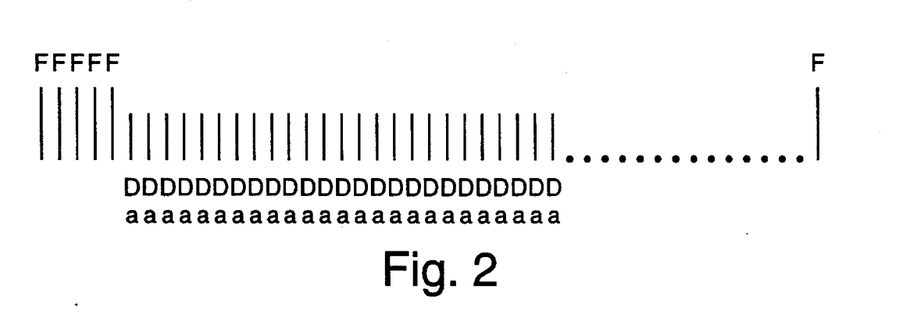
FIG. 2 is an example PCM/TDM format with contiguous F bits.

FIG. 2 shows an example PCM/TDM signal stream of data bits (Da), (Db), (Dc) grouped in octets during frame-intervals. Frame interval formats are defined conventionally by Frame Alignment (FA) and Multi-Frame Alignment (MFA) words composed of patterns of Frame alignment bits (F) inserted either contiguous to or periodically between frame boundaries. When a PCM/TDM signal stream is received, in order for the bits combined in the stream to be sorted out by the inverse process of demultiplexing, first, the MCLK timing is recovered as the re-named BCLK signal. Then, bits comprising FA words are searched in streams of bits assembled by a demultiplexer. Candidate FA word patterns are compared against reference FA word patterns until one matches. Unless bits which coincidentally mimic FA words distract the search, contiguous F bit pattern-synch is achieved in one frame interval.

Figure 3:
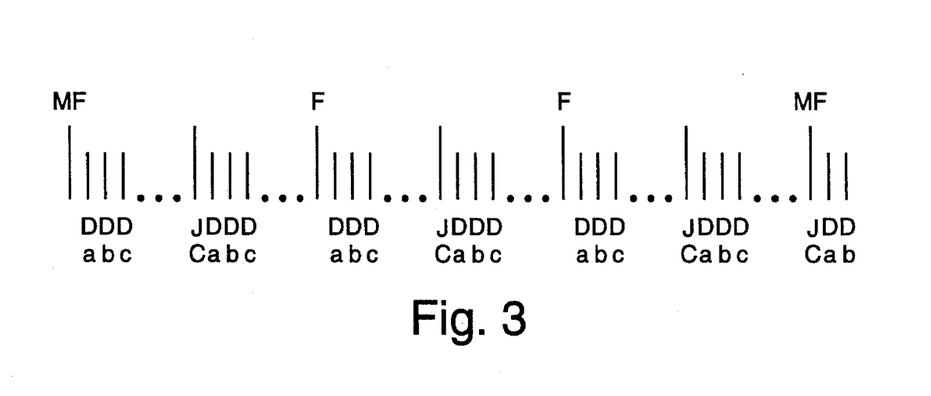
FIG. 3 is an example PCM/TDM format with distributed F bits, justification control JC bits, and justification J bits.

More generally, bits F can be interspersed along frames as illustrated in FIG. 3. In this case, frame-synch requires assembling candidate bits starting from every possible position for a FA word in a frame or multi-frame.

Assembling a candidate FA word from just one starting bit position in each BCLK cycle may not achieve frame-synchronization until assembling candidate FA words from bits at every possible starting position. The probability of attaining frame synchronization is proportional to the total possible starting positions from which FA candidate bits are tested during a given cycle. This requires memory capacity for the corresponding number of candidate FA pattern words.

Multiframe boundaries are coincident with frame boundaries. After FA synchronization there is only one possible starting position in each frame for a candidate Multi Frame (MF) bit. In the absence of bit-errors, MF synchronization is achieved afterwards within one more MF interval.

Justification

In plesiochronous communications, signals from Ia, Ib, Ic timed by CLKa, etc. having precision to prescribed tolerances within which they are uncertain. Therefore, input tributary signal timing deviations are preferably accommodated by Justification (J) bit time-slots (FIG. 3) during which compensating bits may be inserted or deleted. Justification Control (JC) words bit values indicate justification actions to be taken. Each justifiable tributary needs a JC word and a J bit time slot. TDM groupings of frames in multi-frames permits a common control word to be used to justify a different tributary in each frame. This way, a JC word will not have to be tested for every tributary in every frame.

In positive justification, the PCM/TDM stream bit-clock exceeds the nominal tributary bit-clock rates. Occasionally no source data bit is available to occupy a data-slot and so the multiplexer transmits a "stuff" bit in the J bit time slot, and also sets the Justification Control (JC) bits active for the corresponding tributary.

Negative justification may be used where tributary bit-clock rates can exceed the nominal rate of the PCM/TDM stream. J bit time-slots are initially vacant and occasionally used to carry excess bits input from faster tributaries. In this case the corresponding Justification Control bits are activated.

Positive/zero/negative justification uses both positive and negative J slots, and either adjusts up, down, or not at all, rates of data bits received from input tributaries.

Bits JC are arranged either consecutively or interspersed through frames to form JC words. JC words are conventionally interpreted either by odd-majority bit-voting or by pattern-matching. When positive justified tributary frames are received and active bits JC words are detected, stuff bits are deleted from J slots. When negative-justified streams are received and active JC words are detected, data bits are retained in slots J. Zero de-justification deletes stuff bits from positive slots J and retains data bits in negative slots J.

Decommutation

Once the data stream has been dejustified, the bits are routed to the appropriate tributary in accordance with the format in which they were sampled in the multiplexer.

Prior Art Features and Performance

The prior art MPX-100 demultiplexer has been implemented in an IC with a field-programmable working memory, using downloaded software, for decommutating TDM formats in general. The MPX-100 working memory is required to cycle at the rate BCLK of the multiplexed stream. Any programmable demultiplexer depending upon a programmable working memory to cycle at the BCLK rate encounters a dilemma for an implementation in ICs. Memory speeds are inversely related to their sizes. IC memory capacities must be balanced against access speeds. This compromises functioning and programming advantages. With its memory size, the MPX-100 has not operated at 50 Mbit/sec.

Specific applications desire a small demultiplexer capable of very high-speed decommutation of TDM signals and re-programmable for practically any TDM format.

U.S. Pat. No. 4,377,861 by Huffman describes a demultiplexer for re-distributing data bits to respective tributaries by using individual channel units provided with real-time framing information by a state controller and provided with tributary routing selectability by a microprocessor.

In U.S. Pat. No. 4,430,734 by Hubbard, multiple digital voice channels are demultiplexed and added together to establish conference calls. Voice channel data is stored in a buffer memory and extracted by a microprocessor.

There remains, therefore, an need for a programmable decommutator capability to decommutate data streams, such as tributaries in a telecommunications application, from a large variety of TDM formats which operates at the highest attainable data rate and can be implemented in current state of the art IC technology.

SUMMARY OF THE INVENTION

The present invention provides a PCM/TDM demultiplexer which is both operable with fast input bit clocks and is reprogrammable for a variety of formats and levels of hierarchical demultiplexing. "The invention is suitable for embodiment in as few as two and preferable only one IC(s).

Memory sizes and access delay times are minimized by separating demultiplexing transformations into a separate FA function unit and a DECommutation and dejustification (DEC) function unit which operate in a coordinated manner.

Memory sizes and access delay times are further minimized by separating the control within the DEC function unit into a non-branching sequence controller preferably operating at the BCLK rate, and a branching sequence controller preferably operating at a fraction of the BCLK rate.

Memory sizes and access delay times are still further minimized by separating the control memory of branching controllers contained within the FA and DEC function units into an address segment and an instruction segment.

A demultiplexer architecture according to the invention comprises an FA function unit including Frame Alignment Logic (FAL) hardware controlled by a Programmable Frame Alignment Controller (PFAC), and accompanied by a DEC function unit including Output Logic Hardware (OLH) controlled by a Programmable Decommutator Sequencer (PDS) controlled in turn by a Programmable Decommutator Sequencer Controller (PDSC).

Unlike Hubbard, the present invention does not require a frame buffer memory. The invention has the advantage that there is no requirement to store a whole frame of bit-signals. Data bits are decommutated one by one as the TDM stream proceeds through the decommutation function. In contrast to Huffman, the invention provides for state controller implementation efficiency and particularly programmability.

DETAILED DESCRIPTION OF THE PREFERRED EMBODIMENTS

Figure 4:
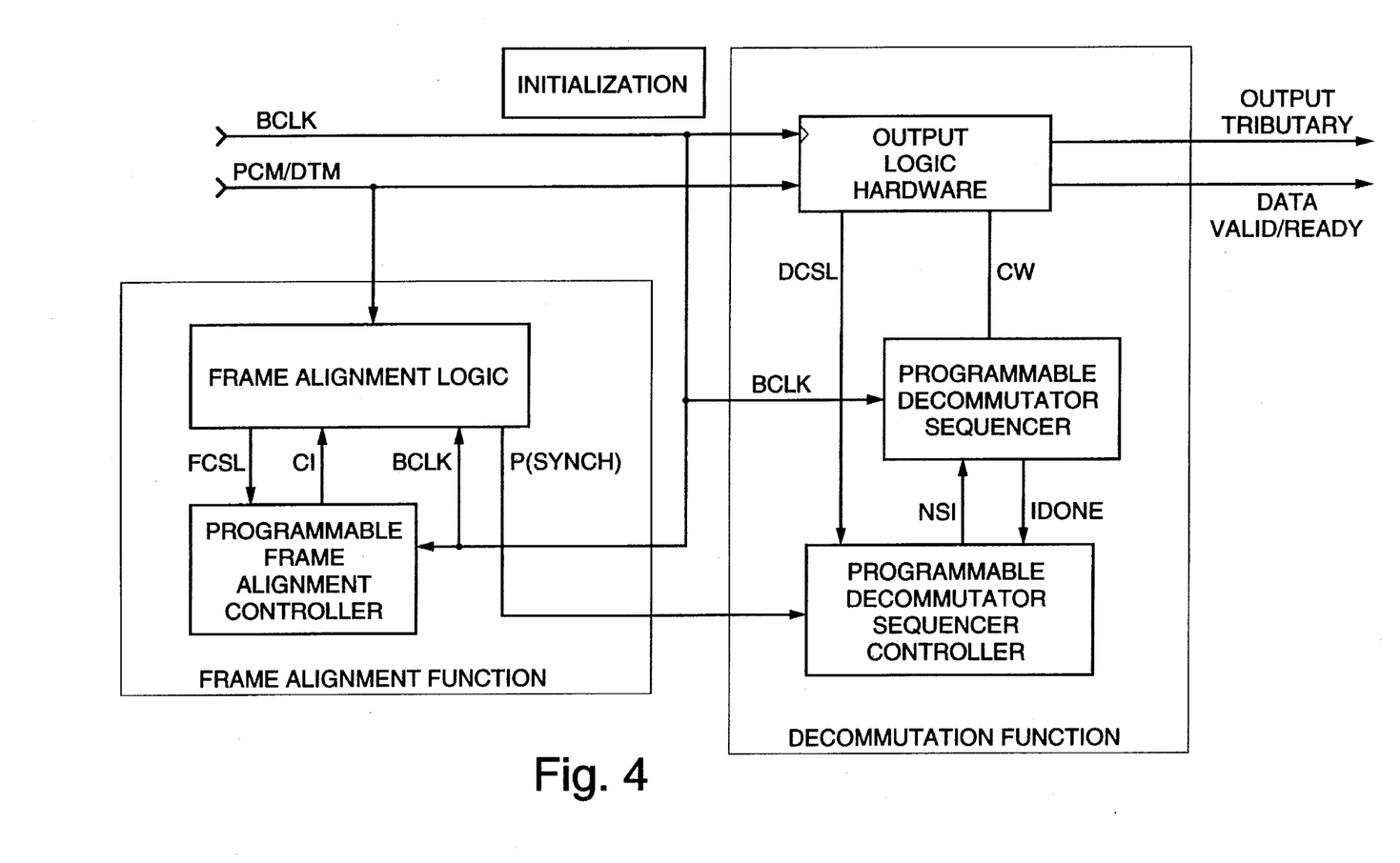
FIG. 4 represents the basic architecture for preferred embodiments of PCM/TDM demultiplexers according to the present invention.

The present invention provides an architecture for a PCM/TDM demultiplexer as shown in FIG. 4 including individual coordinated FA and DEC functions. The invention minimizes its reliance on reprogrammable memory cycling at the BCLK rate, which at the present state of technology may rise to as high as 50 MHz. A balance of hard-wired with programmable logic preserves demultiplexing speed and programming flexibility.

Frame Alignment Circuit Description

Figure 5:
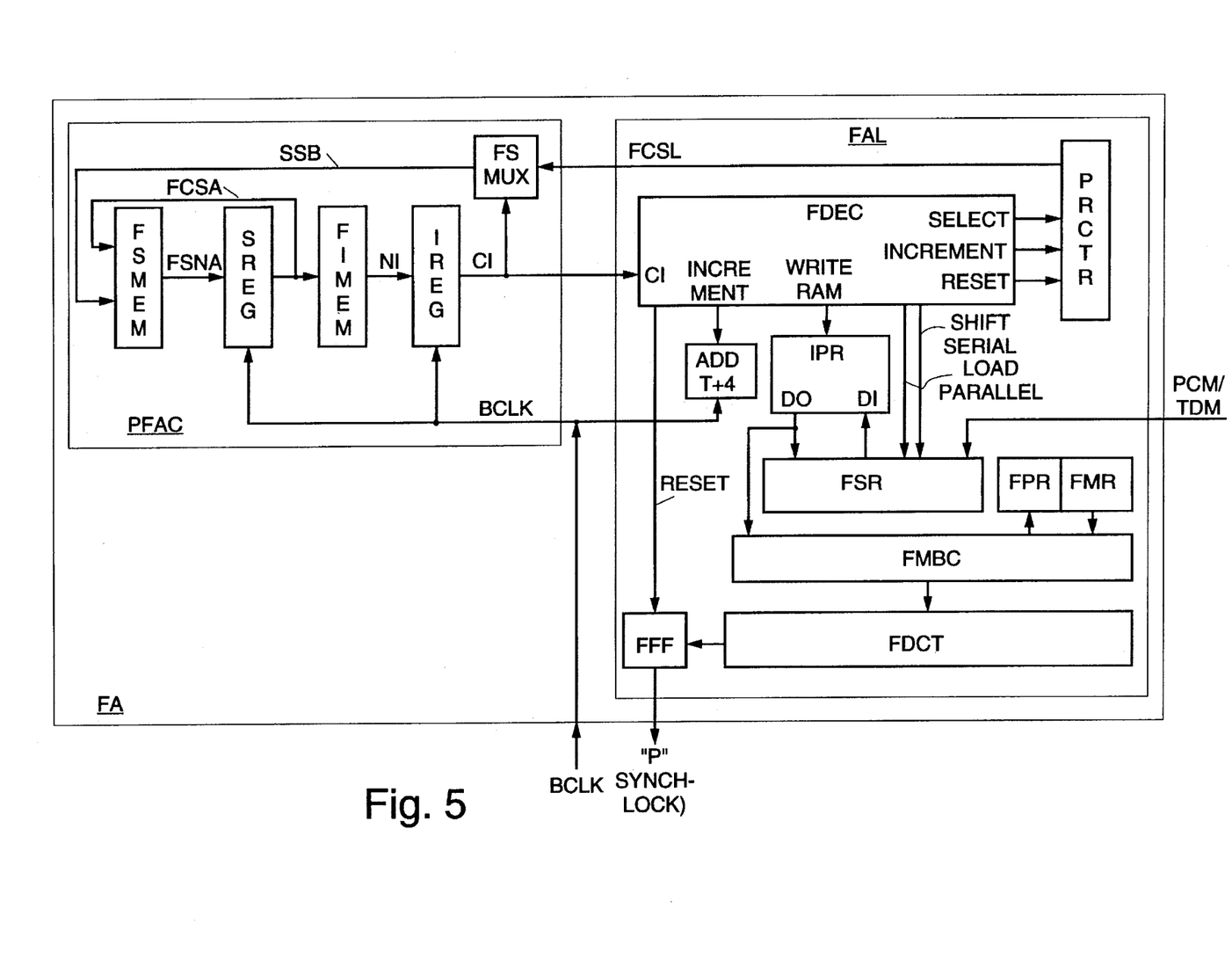
FIG. 5 shows the FA function implemented by FAL and PFAC.

The candidate FA pattern word assembly and matching step of the FA function must keep pace with BCLK, and is therefore implemented by hardwired logic unit FAL. Referring to FIG. 5, the FAL is controlled by the PFAC, which is programmed with short sequences of microcode which it executes at the rate of one microinstruction per cycle of BCLK. The PFAC preferably comprises a branching programmable state machine having control storage partitioned into FAL State address MEMory (FSMEM) and FAL Instruction MEMory (FIMEM) segments, and having Next Instruction (NI) output dependent only upon a current state stored in a State REGister (SREG). The memory segments are each small enough to be accessed at a suitable design margin faster than the fastest specified BCLK rate. The FSMEM presents PEAC Next-State Address (FNSA) signals to SREG. Successive FNSAs are latched on successive cycles of BCLK and presented as PEAC Current State Address (FCSA) signals to address lines of FSMEM and FIMEM. Consequently, FIMEM produces the NI signal. The next cycle of BCLK advances signal NI through Instruction REGister (IREG) to emerge as a Current Instruction signal (CI). CI is applied to PFAC Status MUltipleXer (FSMUX) to select an input FAL Condition Status Line (FCSL) which is used as a Selected Status Bit (SSB) preferably to one address line of FSMEM, to facilitate branching of programs in the controller PFAC. An example FSMEM can store 64 states of which each can branch two ways, which provides up to 128 addresses. CI is received in FAL through FAL instruction DECoder (FDEC). FAL also includes serial/parallel FAL Shift Register (FSR), Interleave Pattern RAM (IPR), initializable ADDress CounTer (ADDCT), reference FA Pattern Register (FPR), FAL Mask Register (FMR), FAL Masked-Bit Comparator (FMBC), FAL DeteCT if all comparisons are TRUE circuit (FDCT), FAL Flip-Flop (FFF), and a bank of (preferably 8) PRogrammable CounTeRs (PRCTRs). In this example, PFAC control memory data is organized as follows:

FAC memory bit assignment:

| Bits | Value | Meaning |
|---|---|---|
| FSMEM Segment | | |
| (0:5) | 0 to 63= | FNSA |
| FIMEM Segment | | |
| (0:1) | 0= | received data bit to be shifted serially into the designated FSR; |
| | 1= | write contents of FSR into IPR; |
| | 2= | increment ADDCT + 4; |
| | 3= | IPR read parallel to designated FSR; |
| (2:4) | 0 to 7= | designated PRCTR; |
| (5:6) | 0= | global PRCTR reset; |
| | 1= | increment designated PRCTR; |
| | 2= | reset designated PRCTR; |
| | 3= | increment ADDCT + 1; |
| (7:10) | 0 to 15= | FCSL selection by FSMUX. |

Speed goals for sync-lock onto FA signals dispersed through frames of particular durations are related to IPR sizes. An FAL embodied in an IC preferably economizes memory area by tolerating slower FA-searches. An IPR capable of storing ¼ of all the potential candidate FA-pattern bits implies that for it to attain FA-sync will sometimes require as long as four frame intervals. To achieve FA-sync, the IPR executes repetitions of:

1. Shifting a 4th-received PCM/TDM bit into the FSR for assembly with candidate FA pattern bits loaded in step 4, thus producing an updated set of candidate FA pattern bits;
2. Writing the updated candidate FA pattern bits back into its respective location in the IPR;
3. Incrementing ADDCT by 4; and
4. Parallel-loading the IPR's newly addressed contents into the FSR in preparation for step 1.

FDCT senses outputs from FMBC. Only when there is a match between IPR and FPR in the bit positions indicated by FMR, FDCT produces a logic TRUE signal. The program in PFAC typically uses counters in PRCTR to keep track of its progress in analyzing the signal stream. It can increment them, reset them, and test them to detect when they are at their terminal count. If the program in PFAC senses that a set of 4th-addressed bit patterns has been collected without finding a match, it preferably operates to incremented ADDCT by 1 and repeat the search on the next set of 4th-addresses until a match is found.

The FIG. 5 FAL can test distributed bits for FA-words beginning in any of 64 time-slots during each frame.

To inspect only one time-slot for a starting bit in each frame, an alternate embodiment of FAL can omit the IPR and ADDCT. Also, contiguous-bit FA pattern-searches which shift bits into the FSR at the BCLK rate do not need the IPR.

Frame Alignment Process Description

PCM/TDM signals are received through circuits which recover MCLK (FIG. 1) timing as BCLK, which accompanies PCM/TDM stream bits arriving at the demultiplexer of FIG. 4.

Received PCM/TDM signal streams expected to have non-contiguous FA-bits are searched for possible starting bits at multiple positions. Each time the assembly of a bit completes a candidate FA-pattern, the assembled pattern-word is masked by FMR and compared in FMBC against a reference FA pattern stored in FPR. Ordinarily, upon the first match, to tag an identified frame boundary, FAL issues a frame-synch Pulse (P). FA-synch losses are not ordinarily conceded until after several failed comparisons. Preferably, FA-loss thresholds are programmable through monitoring by the program in the PFAC of the comparison outcomes in counters such as PRCTR (FIG. 5).

Achieving FA in some TDM formats next involves searching with a multi-frame pattern for a MF boundary. MF boundaries have pre-determined relationships to single-frame boundaries. Hence, MFA word searches need only compare a limited number of positions for potential MFA word start bits, and do not need the IPR.

Dejustification and Decommutation

In decommutating a received PCM/TDM signal stream, various short, structured sequences of bits are manipulated repetitively in a manner predetermined by the particular PCM/TDM multiplexing format, in order to distribute data bits to their respective output tributaries. Dejustification is a modification of the decommutation action. Justification control bits contained in the signal stream are detected, and depending on their interpretation in the particular multiplexing format, a bit from the signal stream may be sent to an output tributary, modified and then sent, or deleted.

The prior art MPX-100 used one state-machine to directly control both its dejustification and its decommutation OLH. Current-state status or condition inputs could cause the state machine used in the MPX-100 to alter its output immediately. However, analysis of MPX-100 operations has ascertained that decommutation processes can be successfully performed by a state machine whose outputs depend only upon preceding-states and conditions. This is the response exhibited by the type of branching state machines used in the present invention. Such machines cycle faster than equivalent machines of the type used in the MPX-100.

TDM decommutation and dejustification control functions according to the present invention are implemented in a combination of two machines. One is a branching state machine operating preferably at a lower clock rate than BCLK, controlling a second, preferably smaller, simpler non-branching state machine operating at the BCLK rate.

FIG. 4 shows the decommutation and dejustification function according to the present invention consisting of an OLH, a PDS and a PDSC. The OLH typically receives short sequences of Control Word (CW) signals from the PDS as a result of the PDS receiving a particular Next Sequence Instruction (NSI) from the PDSC. Each short sequence of CW signals typically controls the OLH to decommutate sequences of bit formats which repeat within a frame. The PDS outputs CWs at the BCLK rate. The PDS is preferably a non-branching sequencer controlled by a counter so that it begins executing the CW addressed by the NSI and then cyclically executes successive CWs until a CW is reached which has the Sequence Done (SDONE) bit turned on, at which time the sequencer decrements the Sequence Repeat Number (SRN) from the NSI, and either signals Instruction Done (IDONE) if the SRN reached the limit count, or starts executing CWs beginning once again with the CW addressed by the NSI. The IDONE signal causes the PDSC state machine to cycle and issue a new NSI signal to the PDS and the process repeats. The sequence generation control process of the PDSC can be made conditional by testing the FA synch-lock line P, or OLH condition status lines DCSL. Typical condition status signals are the status of justification control actions and terminals counts of counters.

The single branching state machine in the prior art MPX-100 had a single segment control memory which cycled at, and limited, the BCLK rate. It was also large compared to the present invention because each location contained storage for a state, an instruction, and an alternate state and instruction.

In contrast, the present invention has only a relatively small memory SPM operating at BCLK speed. The larger DMEM operates preferably at one-fourth BCLK speed, and is smaller than prior art MPX-100 memory due to the different structure of the branching controller PDSC. The PDSC is the type of controller whose output depends only on the current state and not on the current input, so it need not store alternate instruction and state in each location as did the memory of the MPX-100 controller. These improvements together allow PDS and PDSC memory to occupy 30% less total space than MPX-100 memory, while providing comparable performance.

Conditional PDSC instructions are supported for branching to another part of the program or calling a subroutine in the usual manner in computing controllers. When an NSI is a procedure CALL, SUBroutine Control (SUBC) bits cause Next State Logic (NSL) Subroutine-Return Register (SRR) (detailed in FIG. 6d) to increment the value of, and then save, the normal Decommutator Next-State Address (DNSA). When the body of the subroutine has been completed, a RETURN instruction generates SUBC field bits to designate the SRR as the source for the Decommutator Current-State Address (DCSA) word.

The "IF ... THEN GOTO" instruction can be looped and further nested by incrementing and testing OLH registers which are similar to PRCTR in FIG. 5. Referring to FIG. 6a, for conditional instructions the branch condition select (IF) bits direct Status MUltipleXer (DSMUX) to select an OLH Condition Status Line (DCSL) or line P to test and thereby influence the PDSC output on the next cycle.

Figure 6:
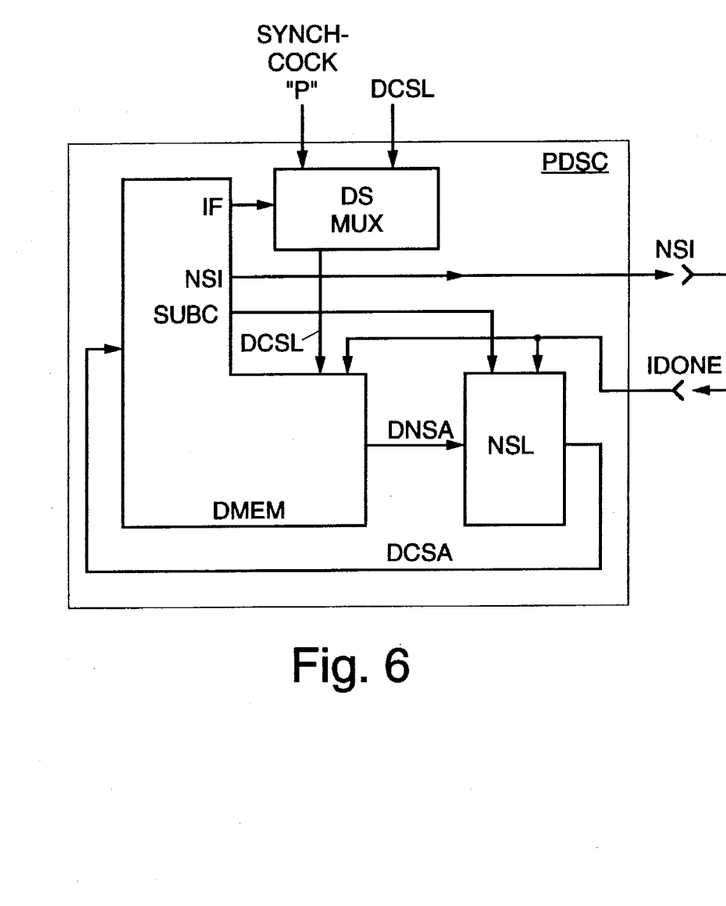
FIG. 6 illustrates a generic PDSC architecture.
Figure 6A:
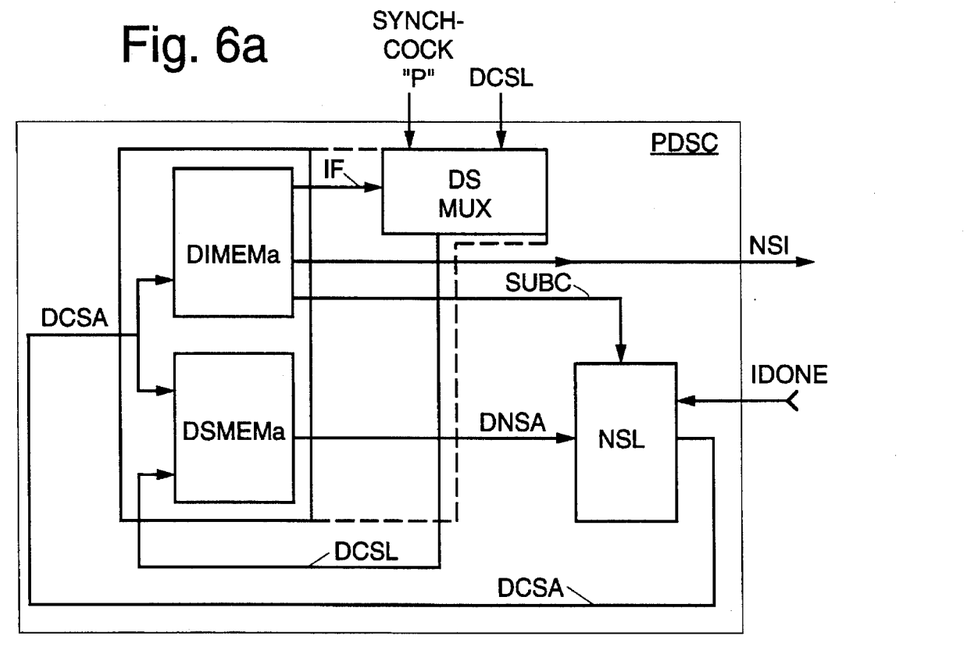
FIG. 6a shows a PDSC in a first embodiment.
Figure 6B:
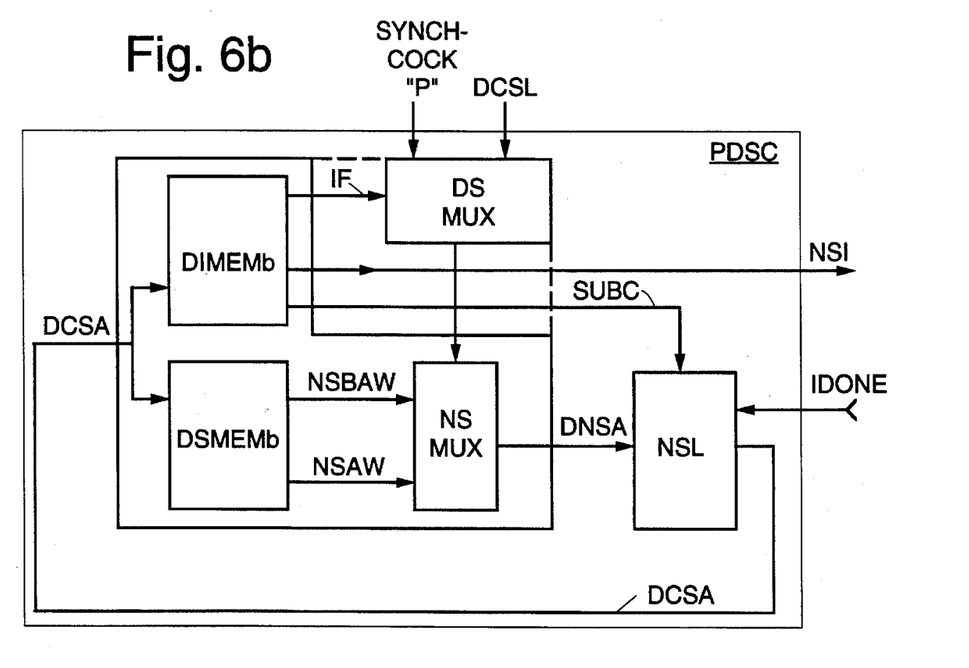
FIG. 6b shows a PDSC in a second embodiment.

The FIG. 6 generic PDSC is shown in alternate embodiments in FIGS. 6a, 6b, 6c and 6d, each of which partitions DMEM differently. PDSCs in the embodiments of FIGS. 6a and 6b have DMEMs partitioned into Decommutator State MEMory (DSMEM) segments a and b, respectively (DSMEMa, DSMEMb) and Decommutator Instruction MEMory (DIMEM) segments a and b, respectively (DIMEMa, DIMEMb). In FIG. 6a, a DNSA is output from DSMEM when addressed jointly by DCSA bits and by a DCSL bit selected by the IF signal. The FIG. 6a DSMEMa of 256 words×7 bits is exchangeable for the FIG. 6b DSMEMb of 128 words×14 bits. FIG. 6b DSMEMb outputs two parallel 7-bit fields, providing both a Next-State Address Word (NSAW) and a Next-State Branch Address Word (NSBAW), to a Next-State Multiplexer (NSMUX) which selects either NSAW or NSBAW as the DNSA.

Figure 6C:
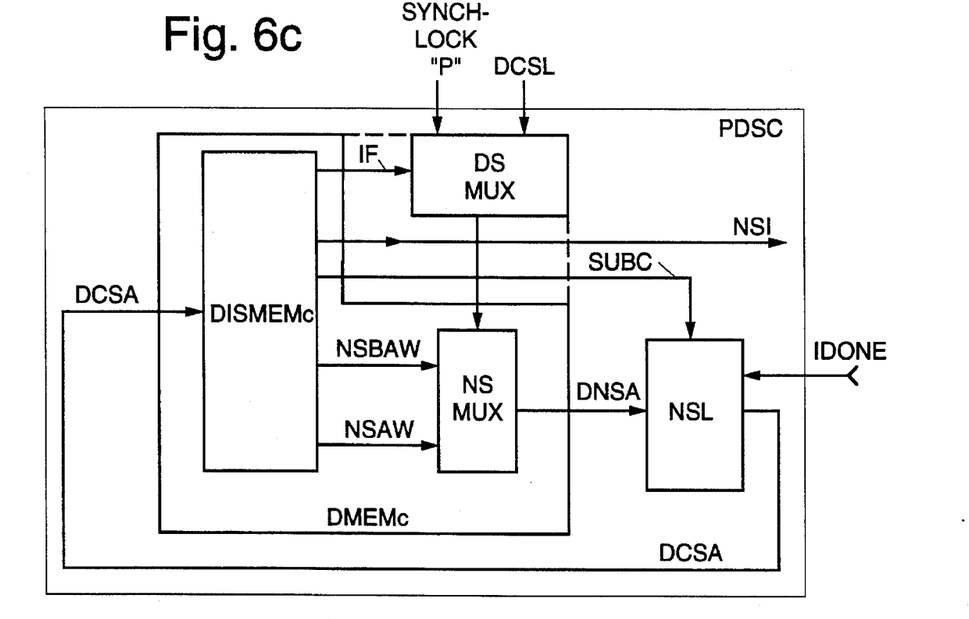
FIG. 6c shows a PDSC in a third embodiment.

FIG. 6c shows the PDSC in a third embodiment having its state address and instruction memory collected in Decommutator Instruction and State MEMory unit c (DISMEMc), which remains equivalent in total capacity to DSMEMb plus DIMEMb of FIG. 6b. All three of these DMEM embodiments a,b,and c (DMEMa, DMEMb, and DMEMc) have equivalent storage capacities of 3456 bits.

Figure 6D:
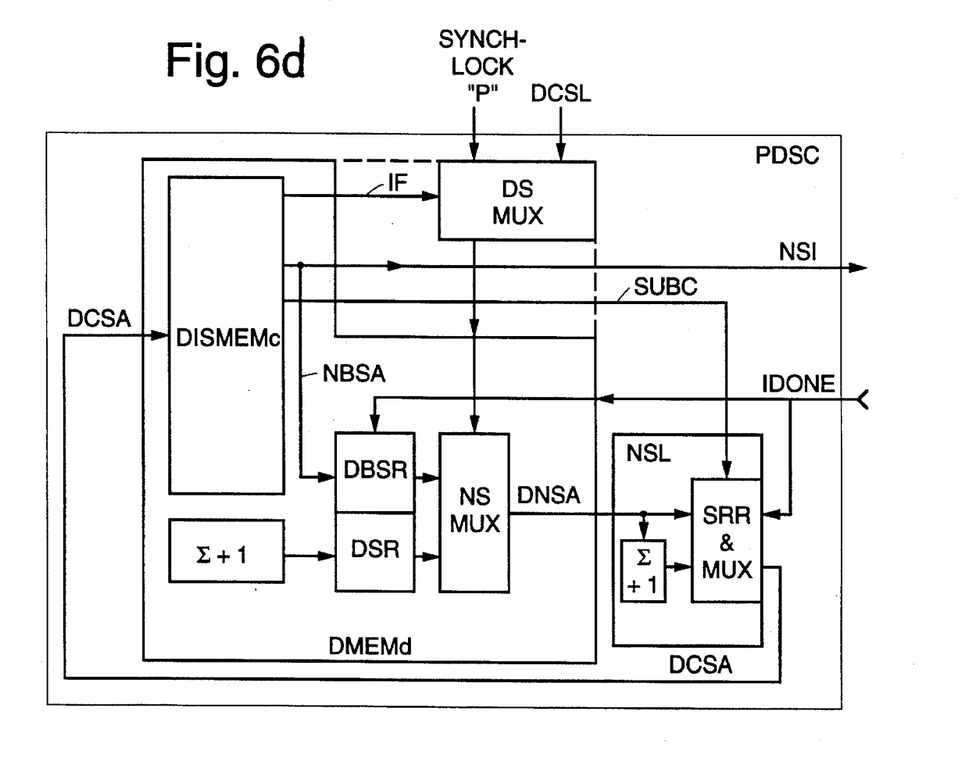
FIG. 6d shows a PDSC in a fourth embodiment.

FIG. 6d shows a further improvement in memory requirements over the FIG. 6a, 6b and 6c embodiments. Decommutator Instruction and State MEMory unit d (DISMEMd) area and, therefore, access time is reduced almost by half in the embodiment shown in FIG. 6d. This embodiment takes advantage of PDSC programs being structurable mostly "in-line," branching only infrequently.

In the FIG. 6d embodiment, next-state addresses are generated simply by incrementing the DCSA. With each IDONE signal Decommutator Sequencer State Register (DSSR) stores the incremented DCSA, which is then selected as the DCSA.

CALL and GOTO instructions are executed in two access cycles of DISMEMd. Conditional instructions are executed by selecting an input for DSMUX to select either the Decommutator Branch State Register (DBSR) or the DSSR as the source for DCSA. By placing the Branch State Address (BSA) in the DISMEMd address just after the CALL or GOTO instruction, the second DISMEMd access outputs the BSA in place of NSI and BSA as input into the DBSR. The DBSR output is consequently selected as the new DCSA.

Subsequent DCSA's are generated by incrementing DCSA and storing it in DSSR. A RETURN is executed in all FIG. 6 embodiments by storing return a address in the SRR.

Decommutator Dimensions

The PDSC is preferably embodied as illustrated in FIG. 6d. The majority of standard or non-standard format PCM/TDM decommutation programs are executable using Decommutator Instruction MEMory (DIMEM) of 128 words including fields of SUBroutine Control (SUBC) in bits 11–12, branching control (IF) in bits 8–10, and Next Sequence Instruction (NSI) for the PDS in bits 0–7. NSI is further divided into Sequence Repetition Number (SRN) in bits 4–7, and Current Scan Sequence (CSS) in bits 0–3.

| DIMEM fields: | | |
|---|---|---|
| Bits | Value | Meaning |
| (0:3) | 0 to 15 | MSBs of starting address for next scan-sequence in the PDS; |
| (4:7) | 0 to 15 | Number of repetitions to execute next scan-sequence; |
| (8:10) | 0 to 7 | Selected DCSL condition status lines; |
| (11:12) | 0= | NORMAL (the DCSA source is DSR); increment DCSA after each DISMEMd access, and store incremented DCSA in DSR. |
| | 1= | CALL subroutine (while the current NSI is being executed, increment DCSA to again access DISMEMd. The NSI field is used not as a next instruction but as a branch address and stored in DBSR for the next DCSA. DCSA is incremented and stored as the return address in SRR. |
| | 2= | RETURN from subroutine (select SRR contents as DNSA). |
| | 3= | GOTO same as CALL, except without return address in SRR. |

The PDS executes "scan-sequences" of micro-instructions to manipulate input PCM/TDM signal bits. A specific scan-sequence and its number of repetitions are designated by the NSI. While the PDS is executing this previously loaded NSI, the PDSC sets up the next NSI. When a scan-sequence's last cycle has been completed the PDS asserts an IDONE signal which loads the waiting NSI into the PDS, and cycles the PDSC to select the following NSI.

Thus the PDSC cycles through its states at the IDONE rate, or at twice the IDONE rate for CALL or GOTO instructions. The maximum PDSC design cycle rate can be adjusted by limiting the length of the shortest (fastest) scan-sequence which the PDS will execute. A practical limit allows the PDSC to cycle no faster than one-fourth the rate of the PDS, which cycles at the BCLK rate.

Figure 7:
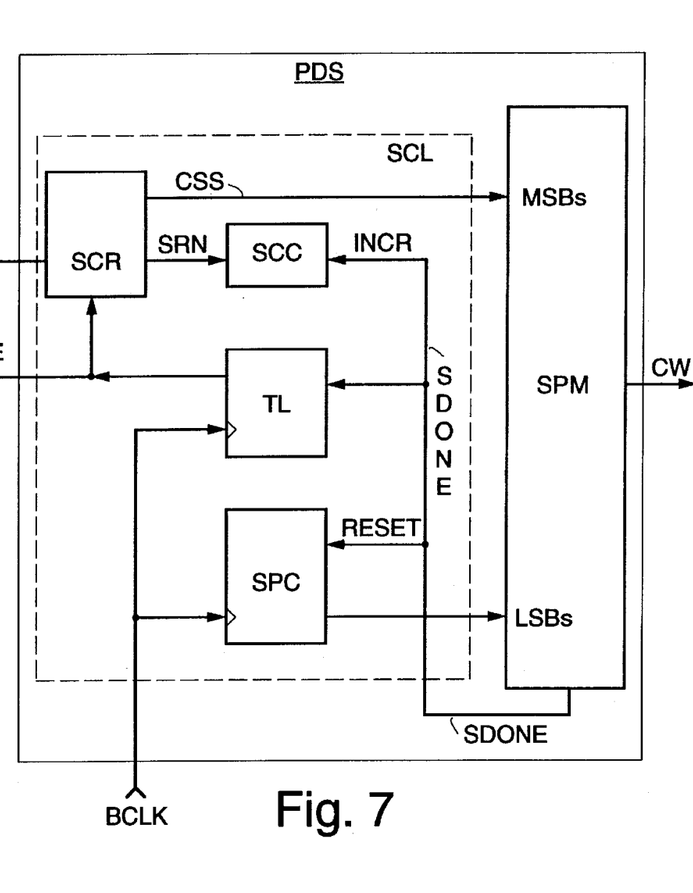
FIG. 7 shows a PDS embodied in preferred Sequence Program Memory (SPM) and Sequence Control Logic (SCL) components.

The PDS is shown in FIG. 7 embodied in sequence program memory (SPM), and in sequence control logic (SCL) in turn including a Sequence Control Register (SCR), a Sequence Cycle Counter (SCC), Terminal Logic (TL) and a Sequence Program Counter (SPC). The SPM has a capacity of preferably 256 words of 8 bits each writable with data fields defining micro-instructions such as:

| SPM Fields: | | |
|---|---|---|
| Bits | Value | Meaning |
| (0:2) | 0 to 7 | Tributary number |
| (3:6) | 0= | data slot: output data bit |
| | 1= | data slot: output inverted data bit |
| | 2= | data slot: output assembled word |
| | 3= | output logic "0" |
| | 4= | output logic "1" |
| | 5= | control slot: tributary control bit |
| | 6= | control slot: common control bit |
| | 7= | control slot: enable a comparison (in FIG. 8) |
| | 8= | positive justification slot |
| | 9= | negative justification slot |
| (7) | 1= | SDONE |

SPM output CW micro-instructions are used as steps in preferably (4 to 16) clock cycles of (any of 16) scan-sequences executed in response to NSIs.

Assuming the PDS has already returned an IDONE signal, the NSI waiting to be input to the SCL (as shown in FIG. 7) is latched by the SCR and (then) output in parallel as a 4-MSB Current Scan Sequence (CSS) field indicating a starting address, and a four-LSB field indicating a SRN of times to repeat addressing, of a scan sequence in the SPM. The LSBs initialize and BCLK increments LSBs through SPM addresses to output CW bits (0:6) to the OLH.

SPM scan-sequences terminate when a CW contains a 'one' in bit No. 7 (SDONE) which increments SCC, resets the SPC and restarts execution of the current scan-sequence.

The PDSC sets up a following NSI while current scan-sequence instructions are re-executed until their final repetition has been completed by the PDS.

When the SCC reaches its terminal count=SRN, the TL allows SDONE to generate an IDONE signal which strobes the SCR to latch in another NSI. Referring again to FIGS. 6, the IDONE signal simultaneously strobes the NSL to latch another DNSA for feedback as a new DCSA. Additional NSIs may be used to extend to 32 or beyond the number of repetitions of given sequence.

An example scan-sequence consists of eight CWs for causing the OLH to decommutate data signals to eight tributaries in a selected order. CW signals are equivalent to strings of in-line code repetitively "calling" the "hardware subroutine" FIG. 8 OLH to perform dejustification or decommutation operations. Data Output Logic Hardware The architecture according to the present invention for controller-sequencer-hardware for decommutation is well adapted also for dejustifying signals in synchronous and/or plesiochronous multiplexing environments.

Preferably, conditional data signal bit manipulations such as dejustifications are performed in hardwired logic by the OLH rather than by having the PDSC selecting a justification control program sequence for this purpose to be exercised by the PDS.

Figure 8:
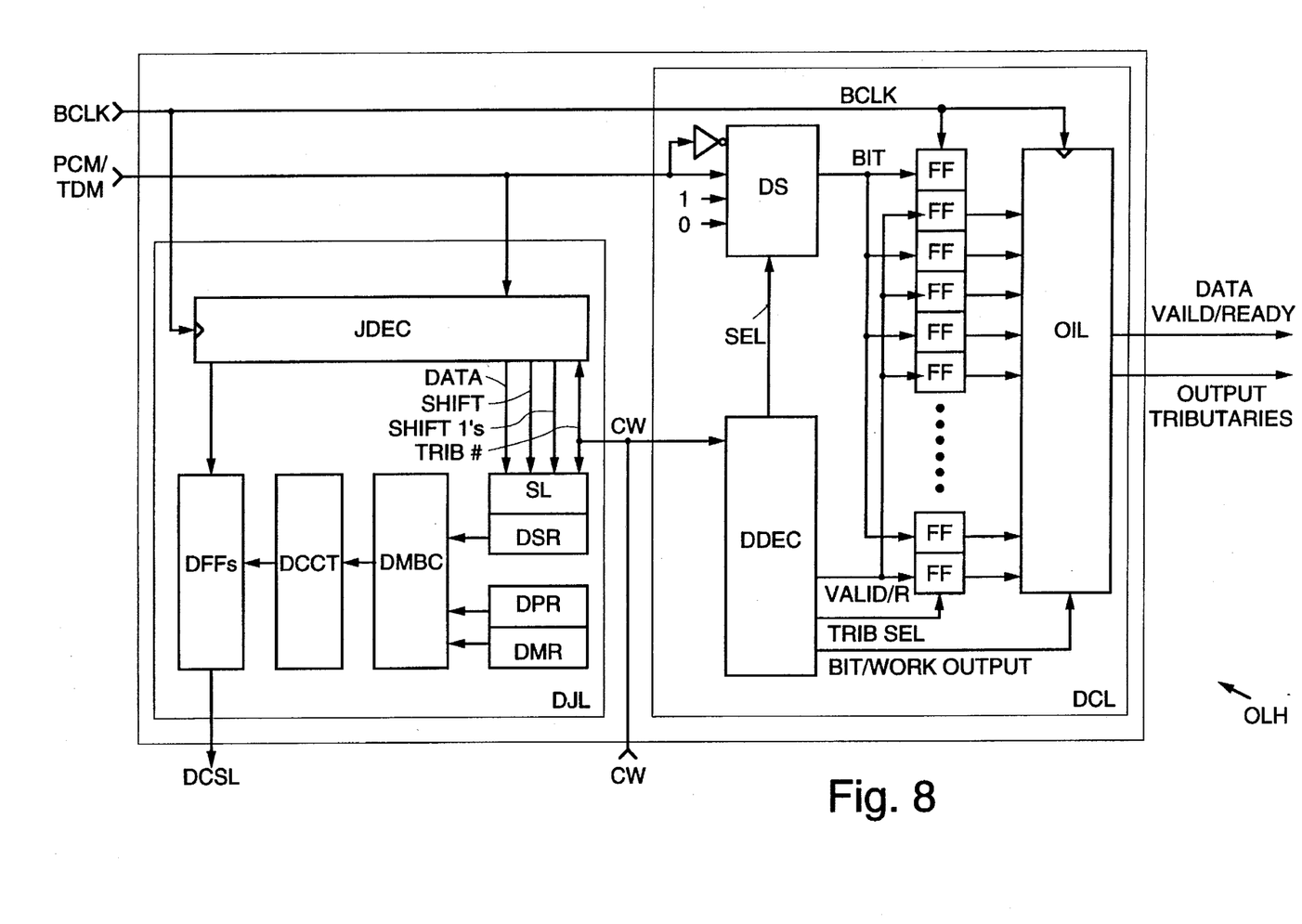
FIG. 8 shows OLH hardwired in DeJustification Logic (DJL) and DeCommutation Logic (DCL) circuits.
Figure 9:
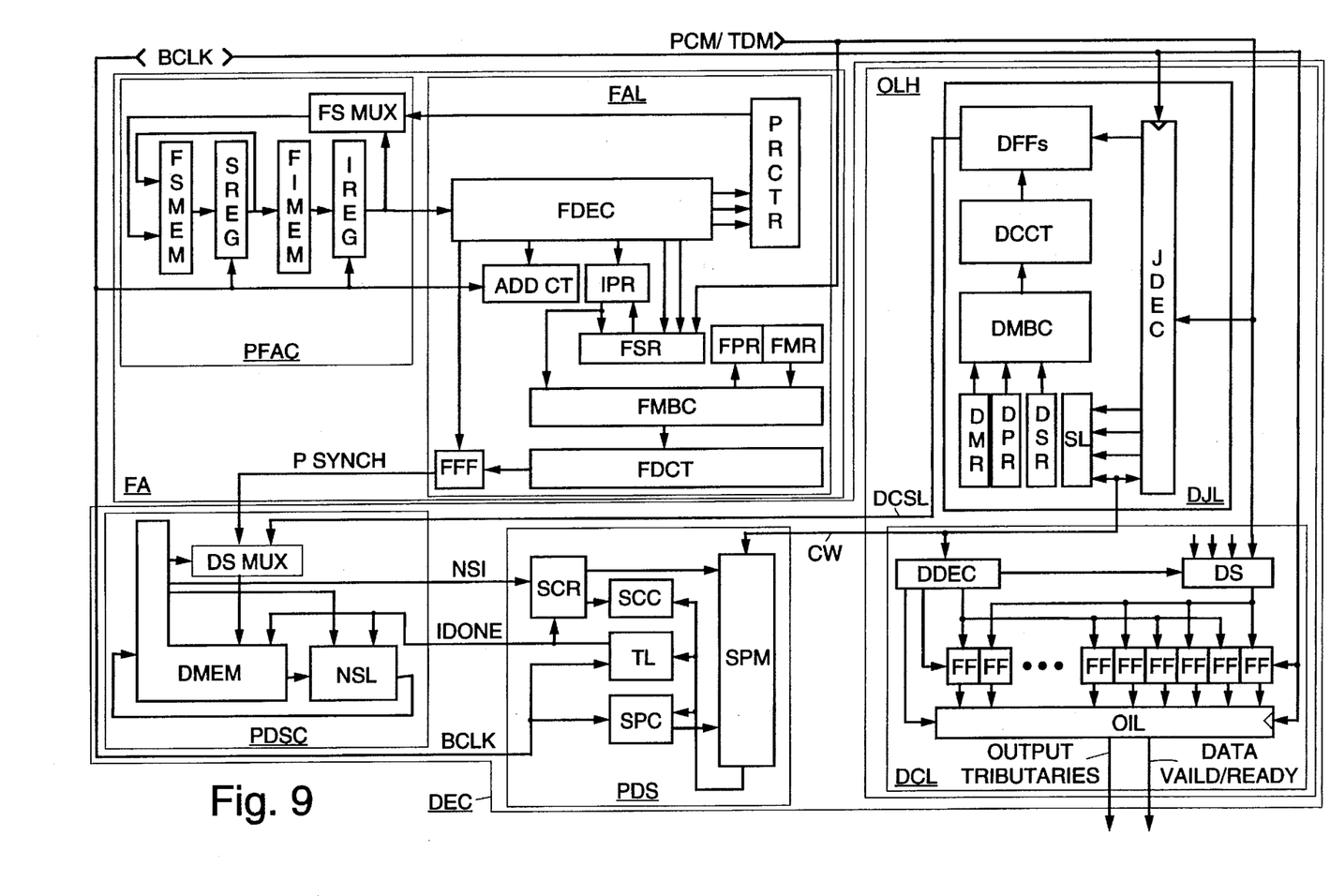
FIG. 9 connects the FA function of FIG. 5 and the DEC function of FIGS. 6–7, 8 in an example implementation.

The OLH includes dejustification control logic (DJL) and decommutation control logic (DCL). The Output Interface Logic (OIL), besides a data signal, also provides a "data valid/ready" signal, controlled by the Decommutator data field DECoder DDEC.

FIG. 8 represents DJL hardware for assembling and interpreting Justification Control words from JC bits as noted for the example in FIG. 3. DJL includes a Justification data field DECoder and data select (JDEC), Shift Logic (SL), Dejustification Shift Registers (DSR), Dejustification Pattern Registers (DPR), Dejustification Mask Registers (DMR), Dejustification Masked-Bit Comparators (DMBC), a Dejustification DeteCT if all bits compare register (DDCT) and Flip-Flops (DFFs).

Received PCM/TDM stream bits which are candidates for being bits JC are shifted singly into one of the 8 DSR selected by tributary select bits (0:2) of CW. Bits JC may be contiguous in a frame or distributed within a frame or across multiple frames. The DJL can assemble bits from arbitrary formats because bit JC shifting is controlled by the CW input to JDEC. The Dejustifier Shift Registers' (DSR) contents are compared by Dejustifier Masked Bit Comparator (DMBC) against a mask and a reference pattern retrieved from respective registers Dejustifier Mask Register (DMR) and Dejustifier Patter Register (DPR). The Dejustifier DeteCT-if-all-bits-compare circuit (DDCT) asserts a TRUE signal if all non-masked comparing bits match. Once a Justification Control word has been assembled in a DSR, a JDEC enable-comparison (RESET) signal latches the DDCT output into one of the eight DFF's.

Preferably, an initialization procedure configures DJL with rules for specific justifications. For example, common JC words are strings of an odd number of "1"s for which the rule is to recognize that the majority of bits in the JC are "1"s. In this example, the initialization procedure configures either SL to shift only "1"s. Then, DMBC tests for strings of (n/2)+1 "1"s, where "n" is the number of "1"s in the JC word. Thus, for JC words of five "1"s (11111), DMBC tests for strings of a majority out of five, i.e., at least three "1"s, e.g., 111xxx.

FIG. 8 shows the DCL, which includes a DDEC, a Data Selector (DS), a set of 16 FFs, and OIL. CW ordinarily has its bits (3:6) set to equal zero and causing DS to select the current PCM/TDM data bit signal as the data source. However, as a result of dejustification, CW bits (3:6) may either =1 causing DS to select the PCM/TDM data bit complement, =4 to select a logic one, or =3 to select a logic zero. The DS output data bit and the DDEC data Valid/Ready bit set whichever pair of FFs is designated by tributary select bits (0:2) of CW.

Returning to FIG. 8, the justification control signal test outcomes are output as DCSL signals to the PDSC. At the estimated time for executing a justification action, the PDSC produces an NSI conditioned on a DCSL status. The NSI then controls the PDS to output a CW which causes the DCL (FIG. 5) to control the data valid/ready bit and thereby perform a justification action as described above. If there is a data bit contained in the current time slot then the data valid/ready signal will be asserted to indicate that a tributary data is being output. Conversely, if there is not a data bit in the current time slot, then the data valid signal will not be asserted.

In FIG. 8 the OIL outputs bit-serial data and data-valid from up to eight tributaries. Other embodiments of OIL could output word-serial or word-parallel data signals from each possible tributary. OIL contains sufficient registers and logic for an application to prepare output word-parallel data from multiple tributaries, and ready signals for each tributary.

Initialization

The present invention advantageously facilitates INITialization by a separate function (INIT), which FIG. 4 shows as an off-line configuration control from which, preferably, upon power up and/or reconfiguration, configuration and initialization information is input through a serial port and transmitted to the various elements of the demultiplexer by way of conventional additional data paths not shown in drawings 4 through 9. Initialization signals are down-loaded first, to load micro-programs into both controllers' state and instruction memories; second, to load the scan-sequencer micro-program into the SPM; third, to configure the FAL, DJL and DCL output logic hardware; fourth, to load terminal-count values into counters in OLH; and finally, to load OLH correlation patterns into pattern registers and masks into mask registers. The MPX-100 performed initialization functions within the state machine, although the MPX-100 still required off-line down-loading of its state memory control store. The present invention's combination of down-loading memories and configuring hardware significantly reduces the control store size requirements, at the modest expense of additional hardware which is a good tradeoff to minimize control store sizes.

The present invention provides a means for demultiplexing currently available and potential multiplex formats, and is primarily targeted to demultiplex conventional and unconventional (i.e., standard and non-standard) time division multiplex protocols. The programmability feature is important from two standpoints. First it provides for a universal multiplex capability, and second it provides for a capability of demultiplexing new formats (by virtue of software or firmware changes) as they are introduced. Programming the demultiplexer is comprised of loading the FSMEN and the FIMEN memories as well as initializing the logic including the FAL mask register FMR and the FA pattern register FPR.

Referring again to FIG. 5, the conventional practice in combining low data rate sources in a time division multiplexed fashion is to form multiplex frames of a fixed size (number of bits). In the simplest formats, the beginning of such a frame is identified by a unique bit pattern (frame alignment word) and the location of each sample of the multiplexed low data rate source is fixed within a frame format. In this example, the function of a frame alignment circuit is to locate this pattern by correlating the incoming bit stream against this unique frame alignment word. Having found such a word, the usual strategy is to test for a repetition of such a word one frame later. If the frame alignment word is found one frame later, a counter is incremented. When the number of successful frame correlations reaches a threshold, then frame alignment is declared and decommutation can be initiated. From then on, for every frame, the frame alignment word continues to be monitored. If it is not located at the expected position for some number of times, then the decommutation process is most likely disabled and a new search for the frame synchronization word is started.

A more complicated framing scheme is to disperse the bits that constitute a frame alignment word throughout a frame (interleaving). This complicates the frame alignment problem since it takes a whole frame to assemble a single candidate frame synchronization word. Although these are the two most commonly used techniques for "marking" frames, there are a number of unconventional time division multiplex formats that add additional levels of complications in the task of finding the beginning of a multiplex frame.

The function of the frame alignment circuit is therefore to find the beginning of a multiplex frame in the least possible time interval, and in the presence of noise or other disturbances to monitor the viability of frame synchronization and to reinitiate a frame alignment search in case of lost synchronization. The frame alignment logic which is described herein provides considerable flexibility by having as a feature programability to perform the frame alignment function for any conceivable framing protocol and to operate under adverse noise conditions. A number of programmable counters (PRCTR) are provided to facilitate such functions as counting the number of bits in a frame, the number of bits between interleaved framing bits, the number of frames in a multi-frame protocol, the number of times in a row that a frame word has been found (or not found) and so on. Another feature of the frame alignment function is the interleave pattern RAM (IPR) and associated logic. In situations of interleaved frame alignment words, this feature significantly speeds up the frame alignment process since the search can be performed in parallel at a multiplicity of possible bit positions in a frame. The level of increase in search speed is directly proportional to the size of this memory.

The frame alignment instruction memory (FIMEM) stores the next instruction (NI) which, at the output of the instruction register (IREG) becomes the current instruction (CI). The current instruction controls the operation of the frame alignment logic (FAL). The current instruction is decoded by the FAL instruction decoder (FDEC) in the frame alignment alignment logic. Examples of such instructions are to reset a counter(s), increment a counter (the functions of the programmable counters are described above), write the contents of the FAL shift register (FSR) into the interleave pattern RAM (IPR), etc. The FAC memory bit assignment table provides a typical instruction word format.

The frame state address memory (FSEM) stores next state addresses (FNSA) which become the current state address (FCSA) at the output of the state register (SREG). A portion of the FCSA word forms the address of the instructions that are stored in the FIMEM. In other words, if the FA is in a particular state, the FAL performs a specific function as determined by the current instruction CI. The current status of the FAL, and primarily the terminal counts of he PRCTR counters is designated by the FCSL signal. Each bit in the FCSL signal stands for the status of one of the FAL logic circuits. The FSMUX, under control of the current instruction signal CI selects one of these bits to form the selects status bit (SSB).

As an example, the current instruction CI may cause the FSMUX to select the bit which designates the status of the terminal count of a counter that is counting the number of times a frame alignment word has been found. When this bit in the FCSL signal is set then the selected status bit (SSB) will be set and as a result the next frame state address memory (FSEM) will "jump" to a new sequence of state addresses which are commensurate with performing the function of monitoring continuing frame alignment.

The interaction between the various elements of the frame alignment logic FAL can best be described by the following examples.

Consider the simple example of a single contiguous 10 bit frame word. During the initialization function, the FA pattern register (FPR) is loaded with the expected frame word pattern and the FAL mask register (FMR) is loaded with ten "ones". Assume that the FA is in a "search" state. In this condition the current instruction CI does not change and the decoder FDEC causes the following events to take place. A shift serial signal shifts the incoming PCM/TDM data stream into the FSR. Every bit time the first ten bits (as controlled by the FMR) in the shift register (FSR) are compared against the bits stored in the pattern register (FPR). This comparison is performed in the FAL detector (FDCT). When all ten bits compare, one of the PRCTR counters is incremented, and the SSB bit is set (via the FSMUX selecting a bit in the FCSL word). This causes the FSMEM to cycle and the FA is now in a "verify" state.

The current instruction is now modified as to enable the FDCT only when the PRCTR counter which counts the number of bits per frame is at its terminal count. If, one frame later there is another pattern match, then the PRCTR counter which counts the number of matches is incremented. In this "verify" state the selected bit in the FCSL word indicates a terminal count in this PRCTR counter. The process is repeated until a terminal count is reached and the FA state now goes to a synch-lock state.

In this state, the current instruction disables the reset signal on the FAL flip flop (FFF) such that is can be set, and the FA outputs a signal to the decommutation logic, which indicates the beginning of a frame. The exact mechanization of how this is implemented can, of course, have many variations, but this provides a description of how these logic elements are interrelated. Additional sophistication may be built in such as using several counters to keep track of the number of successful comparisons versus unsuccessful comparison, as well as different strategies regarding when to declare an in-lock and not-in-lock conditions (i.e., frame alignment). Also, the FAL mask register FMR may be programmed to mark "don't care" bits, if desired.

Other functions of the FA are, having found frame alignment, another search may be initiated to find multi-frame patterns that are used in certain multiple formats. There is no difference in the principle of operation in finding multi-frame patterns.

A more complicated example is the case of an interleaved frame alignment (FA) word. For example, consider the case of a two hundred bit frame where every twenty bits is one bit of a ten bit FA word. For simplification, first consider the case where there is no interleave pattern RAM IPR. The serial shift signal to the FSR is now only enable every twenty bits. After ten shifts, i.e., one frame, a ten bit word is contained in the FSR. This is the candidate FA pattern. There is one chance in twenty that this is indeed the correct FA pattern. If no comparison is obtained, this this process is repeated but slipped by one bit position in the frame until a match is found. In this example, the search time is from one to twenty frames in duration. The search time increases in proportion to the number of bits between FA word bits.

The purpose of the interleave pattern RAM IPR is to speed up this search process. Consider an IPR that can store twenty "candidate FA patterns". The shift register is now used in two different modes. First, the PCM/TDM data stream is only shifted into the first stage of the shift register. All other stages are loaded in parallel by the IPR. The cycle of operation in this hypothetical case, is as follows. Start with a cleared FSR and each bit time write one bit of the PCM/TDM data stream into the least significant bit of the IPR, incrementing its address counter every time. After twenty bit times, the IPR will contain twenty successive bits of the PCM/TDM data stream in twenty successive memory locations.

The next twenty successive bit times, repeat this process but first clear the IPR address register and parallel load the FSR with the contents of the IPR but shifted by one bit position. In other words, during the twenty bit interval, the FSR will contain one old bit (from the IPR) and one new bit from the PCM/TDM data stream and this is again written back into the IPR. Repeating this process, after one frame interval, the IPR will contain twenty complete candidate FA pattern words. One of the twenty words will contain the correct pattern (assuming no bit errors) but in nineteen cases out of twenty, the pattern will be rotated relative to the pattern stored in the FPR. If no match is sensed during the last twenty bits of the frame cycle, then the process is repeated. The terminology "updated FA pattern bits" used herein refers to the updated contents of the IPR.

In the next phase, the IPR loads the FSR with a complete candidate FA pattern but shifted by one bit every twenty bit intervals. As the rotation is removed by virtue of these shifts, one of the candidate FA patterns will eventually match the pattern in the FPR and the FAL state cycles to the "verify" state. As a consequence the search time is roughly between one and two frame intervals.

This simplified explanation of the IPR implies a capability to execute a number of operation for every bit period of the PCM/TDM data stream. The specification describes a scheme that stores ¼ of all the candidate FA patterns. The operation is the same as described above, but only every fourth candidate FA pattern is assembled as described. Upon completion of assembling all the candidate words and all possible shifts, if no match is found, then the cycle is repeated but shifted by one bit period. In the worst case, this technique is up to four times longer as before but has the dual advantage of a smaller IPR and a cycle time equal to the bit period of the PCM/TDM data stream.

It will be obvious to one skilled in the art that this invention relates to a system for optimizing the speed and flexibility of a PCM/TDM demultiplexer where constraints must be observed as to the total volume of logic circuitry that may be used, and that, as the technology for packaging logic inevitably improves, the principles described herein may be applied to produce embodiments of this invention that are faster, more compact, or both. In addition, it is clear that other functional elements not described herein may be included within the structure of the preferred embodiment, such as a feedthrough descrambler.

What is claimed is:

1. Apparatus for demultiplexing a PCM/TDM input data signal containing frame alignment signals that are used to achieve frame synchronization, said apparatus comprising:

frame alignment logic means for receiving said PCM/TDM input data signal, a bit clock signal having a predetermined bit clock rate derived from said input data signal, and a current instruction signal, for detecting said frame alignment signals, for generating a frame synchronization signal in response to the detection of a boundary of a frame in said input data signal, and for generating a frame alignment status signal;

a programmable frame alignment controller for receiving said bit clock signal and said frame alignment status signal, for generating said current instruction signal, and for controlling said frame alignment logic means;

output logic means for receiving said bit clock signal, said input data signal, and sequences of control words for decommutating sequences of bit formats that repeat within said frame, and for generating an output tributary signal, a data valid signal indicating that an output tributary signal has been generated, and a dejustification status signal indicative of a dejustification state of the output logic means;

a programmable sequencer for receiving said bit clock signal, and a next sequence instruction signal, for generating said sequences of control words that decommutate the sequences of bit formats that repeat within said frame, and for generating an instruction done signal; and a programmable sequencer controller for receiving said frame synchronization signal, said dejustification status signal, and said instruction done signal, and for generating said next sequence instruction signal to cause said programmable sequencer to generate said sequences of control words;

and wherein said output logic means and said programmable sequencer are caused to operate at the bit clock rate of said bit clock signal, and and wherein said programmable sequencer controller is caused to operate at a fraction of said bit clock rate.

2. The apparatus of claim 1 wherein said programmable frame alignment controller comprises a control memory operative at said bit clock rate that includes a state segment memory for storing next state address signals corresponding to a memory location of a next instruction signal, and an instruction segment memory for storing said next instruction signal.

3. Apparatus for demultiplexing a PCM/TDM input data signal containing frame alignment signals that are used to achieve frame synchronization, said apparatus comprising:

frame alignment means for detecting said frame alignment signals in said input data signal to locate the beginning of a frame, comprising:

frame alignment logic means (FAL) for receiving said PCM/TDM input data signal, a bit clock signal (BCLK) having a predetermined bit clock rate derived from said input data signal, and a current instruction signal (CI), for detecting said frame alignment signals, for generating a frame synchronization signal (P) in response to the detection of a boundary of a frame in said input data signal, and for generating a frame alignment status signal (FCSL); and programmable frame alignment controller means (PFAC) for receiving said bit clock signal (BCLK) and said frame alignment status signal (FCSL), for generating said current instruction signal (CI) for controlling said frame alignment logic means; and dejustification and decommutation means (DEC) for decommutating sequences of bit formats that repeat within said frame, comprising:

output logic means (OLH) for receiving said bit clock signal (BCLK), said input data signal, and sequences of control words (CW) for controlling said output logic means to decommutate sequences of bit formats that repeat within said frame, and for generating at least one output tributary signal, a data valid signal indicating that an output tributary signal has been generated, and a dejustification status signal (DCSL) indicative of a dejustification state of the output logic means;

a programmable sequencer means (PDS) for receiving said bit clock signal (BCLK) and a next sequence instruction signal (NSI) for generating said sequences of control words (CW) that control said output logic means (OLH) in response to the next sequence instruction signal to decommutate said sequences of bit formats that repeat within said frame, and for generating an instruction done signal (IDONE); and a programmable sequencer controller means (PDSC) for receiving said frame synchronization signal (P), said dejustification status signal (DCSL) and said instruction done signal (IDONE), for generating said next sequence instruction signal (NSI) to control said programmable sequencer means (PDS);

and wherein said output logic means (OLH) and said programmable sequencer means (PDS) are caused to operate at the bit clock rate of said bit clock signal, and wherein said programmable sequencer controller means (PDSC) is caused to operate at a fraction of said bit clock rate.

4. Apparatus for demultiplexing as in claim 3 wherein said programmable frame alignment controller means (PFAC) includes control memory means (FSMEM, FIMEM) operative at said bit clock (BCLK) rate for storing next state address signals (FNSA) corresponding to a memory location of a next instruction signal (NI) and for storing said next instruction signal, (NI), respectively, and which is comprised of a state segment memory means (FSMEM) for storing said next state address signals (FNSA), and an instruction segment memory means (FIMEM) for storing said next instruction signal (NI).

5. Apparatus for demultiplexing as in claim 4 wherein said frame alignment logic means (FAL) includes:

instruction decoder means (FDEC) for receiving said current instruction signal (CI) from said programmable frame alignment controller means (PFAC), for decoding said current instruction signal (CI), for generating a plurality of control signals;

address counter means (ADDCT) for receiving control signals from said instruction decoder means (FDEC), for receiving said bit clock signal (BCLK), and for generating interleave pattern memory address signals in response thereto;

shift register means (FSR) for receiving control signals from said instruction decoder means (FDEC), for receiving a partially assembled candidate frame alignment pattern word from an interleave pattern memory means (IPR), for receiving said PCM/TDM input data signals, for combining said partially assembled candidate frame alignment pattern word and said PCM/TDM input data signals to generate an updated candidate frame alignment pattern word, and for sending said updated candidate frame alignment pattern word to said interleave pattern memory means (IPR), and wherein a first control signal from said instruction decoder means (FDEC) controls said shift register means (FSR) to receive and store output signals from said interleave pattern memory means (IPR) in parallel format, and wherein a second control signal from said instruction decoder means (FDEC) controls said shift register means (FSR) to serially shift the contents of the shift register means (FSR) and said PCM/TDM input data signals;

said interleave pattern memory (IPR) comprising address means for receiving said interleave pattern memory address signals from said address counter means (ADDCT), control means for receiving control signals from said instruction decoder means (FDEC), a memory means for temporarily storing a plurality of candidate frame alignment pattern words, data input means for receiving said updated candidate frame alignment pattern word from said shift register means (FSR), data output means for sending said partially assembled candidate frame alignment pattern word to said shift register means (FSR) and for sending an assembled candidate frame alignment pattern word to masked bit comparison means (FMBC);

pattern register means (FPR) for storing and outputting a predetermined frame alignment pattern word;

mask register means (FMR) for storing and outputting a predetermined frame alignment pattern comparison mask word;

said masked bit comparison means (FMBC) comprising means for receiving said predetermined frame alignment pattern word, said predetermined frame alignment pattern comparison mask word, and said assembled candidate frame alignment pattern word from said interleave program memory (IPR), and for generating bit comparison result signals according to a match or no match between bits in said predetermined frame alignment pattern comparison word and bits in said assembled candidate frame alignment pattern word, and wherein said bits are defined by said predetermined frame alignment pattern comparison mask;

detection means (FDCT) for receiving said bit comparison result signals, and for producing an equality signal responsive to a result of true in all of said bit comparison result signals;

a flip-flop means (FFF) for storing said equality signal produced by said detection means (FDCT) and for producing said frame synchronization signal (P) that indicates a detection of a boundary of said frame said flip-flop means receiving a control signal from said instruction decoder means; and a programmable counter means (PRCTR) for receiving control signals from said instruction decoder means (FDEC), and for producing said frame alignment status signal (FCSL) for use by said programable frame alignment controller means (PFAC).

6. Apparatus for demultiplexing as in claim 3 wherein said instruction done signal (DONE) is generated at a rate lower than the rate of said bit clock signal and is used as a clock for said programmable sequencer controller means (PDSC), and wherein said programmable sequencer controller means (PDSC) comprises:

next state logic means (NSL) for receiving a next state address signal (DNSA) corresponding to a memory location of a next sequence instruction signal (NSI) that is executed, a subroutine control signal (SUBC) and said instruction done signal (IDONE), for incrementing the value of the next state address signal (DNSA) to produce a current state address signal (DCSA) in response thereto that corresponds to memory location of a next sequence instruction signal (NSI) that is to be executed; and a memory means (DMEM) for receiving said current state address signal (DCSA), said instruction done signal (IDONE), said dejustification status signal (DCSL) and said frame synchronization signal (P), and for generating said subroutine control signal (SUBC), said next state address signal (DNSA) and said next sequence instruction signal (NSI), wherein said next sequence instruction signal (NSI) is adapted to control said programmable sequencer means (PDS) and change when said current state address signal (DCSA) changes.

7. Apparatus for demultiplexing as in claim 6 wherein said memory means (DMEM) of said programmable sequencer controller means (PDSC) comprises:

instruction memory means (DIMEMa, DIMEMb) for receiving said current state address signal (DCSA), and for storing and outputting data including said next sequence instruction signal (NSI); and a next state address memory means (DSMEMa, DSMEMb) for receiving said current state address signal (DCSA), said dejustification status signal (DCSL), and said frame synchronization signal (P), and for storing and outputting data comprising said next state address signal (DNSA).

8. Apparatus for demultiplexing as in claim 6 wherein said memory means (DMEM) includes an instruction and address memory means (DISMEMc) for receiving said current state address signal (DCSA), and for storing and simultaneously outputting said next state address signal (DNSA) and said next sequence instruction signal (NSI).

9. Apparatus for demultiplexing as in claim 6 wherein said memory means (DMEM) includes:

next instruction and next branch address memory means (DISMEMd) for receiving said current state address signal (DCSA), and for storing and alternately outputting said next sequence instruction signal (NSI) and a next state branch address signal (NBSA) comprising said next sequence instruction signal (NSI) that is used as a branch address; and logic means (DBSR, NSMUX, DSMUX) for receiving said next state branch address signal (NBSA), said dejustification status signal (DCSL) and said frame synchronization signal (P), and generating said next state address signal (DNSA) from said next state branch address signal (NBSA) or from a result of performing an arithmetic operation ($\Sigma+1$) on a previously generated next state address signal (DCSA).

10. Apparatus for demultiplexing as in claim 6 wherein said programmable sequencer means (PDS) includes:

sequence control logic means (SCL) for receiving said next sequence instruction signal (NSI), said bit clock signal (BCLK) and a last step signal (SDONE), and for generating a current scan sequence signal (CSS) and an output signal indicative of an address of a control word; and sequence program memory means (SPM) for storing control words (CW) therein, for receiving the current scan sequence signal (CSS) and said output signal indicative of the address of a control word (CW) stored therein, for providing said last step signal (SDONE) when a final control word (CW) in a sequence of control words has been output, and for generating said sequences of control words (CW).

11. Apparatus for demultiplexing as in claim 10 wherein said sequence control logic means (SCL) comprises:

sequence control register means (SCR) for receiving said next sequence instruction signal (NSI), for providing said current scan sequence signal (CSS) to said sequence program memory means and for providing a sequence repeat signal (SRN);

sequence cycle counter means (SCC) for storing said sequence repeat signal, for counting the number of times a sequence of control words has been scanned in response to said last step signal (SDONE), and for outputting a cycle complete signal when sequence of control words is scanned the number of times indicated by the sequence repeat signal;

terminal logic means (TL) for receiving said bit clock signal (BCLK), said last step signal (SDONE), and said cycle complete signal, and for outputting said instruction done signal (IDONE) for loading said sequence control register (SCR) and indicating to said programmable sequencer controller means that said sequence of control words has ended; and sequence program counter (SPC) means resetable to a predetermined value in response to said last step signal (SDONE) and operative to increment in response to said bit clock signal (BCLK), for providing addresses of successive control words of said sequence of control words to said sequence program memory means.

* * * * *